United States Patent
Caviedes

(10) Patent No.: US 7,079,704 B2
(45) Date of Patent: Jul. 18, 2006

(54) OBJECTIVE METHOD AND SYSTEM FOR ESTIMATING PERCEIVED IMAGE AND VIDEO SHARPNESS

(75) Inventor: Jorge E. Caviedes, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 711 days.

(21) Appl. No.: 10/180,406

(22) Filed: Jun. 26, 2002

(65) Prior Publication Data

US 2004/0001633 A1   Jan. 1, 2004

(51) Int. Cl.
G06K 9/36 (2006.01)
(52) U.S. Cl. .................... 382/280; 708/403
(58) Field of Classification Search ........... 382/280; 708/403–405
See application file for complete search history.

(56) References Cited

U.S. PATENT DOCUMENTS

| | | | |
|---|---|---|---|
| 5,365,787 A * | 11/1994 | Hernandez et al. | 73/660 |
| 6,240,372 B1 * | 5/2001 | Gross et al. | 702/71 |
| 6,265,874 B1 * | 7/2001 | McGee et al. | 324/312 |
| 6,646,725 B1 * | 11/2003 | Eichinger et al. | 356/28 |
| 2002/0031255 A1 * | 3/2002 | Kasadan et al. | 382/156 |
| 2003/0185417 A1 * | 10/2003 | Alattar et al. | 382/100 |

OTHER PUBLICATIONS

Moliasa et al., "On the Generation of Non-Gaussian Noise Using the Discrete Fourier Transform Method", Apr. 1995, IEEE, pp. 72-78.*

"A Statistical Measure for the Sharpness of the SEM Images", Zhang et al, Proceedings of SPIE, Mar. 10-12 1997 vol. 3050.

* cited by examiner

Primary Examiner—Bhavesh M. Mehta
Assistant Examiner—Aaron Carter

(57) ABSTRACT

A method and system for estimating the quality of video data without gaining access to the source data, are configured to perform a Fast Fourier Transform (FFT) from at least some of the pixel values of the image in at least the horizontal direction, and at most, in the horizontal and vertical directions for the luminance and chrominance components. An average FFT is used to calculate kurtosis and skewness, then an image-quality metric is determined by calculating an offset from the kurtosis and skewness outputs.

17 Claims, 5 Drawing Sheets

OBJECTIVE METHOD AND SYSTEM FOR ESTIMATING PERCEIVED IMAGE AND VIDEO SHARPNESS

BACKGROUND OF THE INVENTION

1. Field of the Invention

The present invention relates to a method and system for measuring the sharpness quality of video data and, in particular, to a method and system for estimating the sharpness quality of pictures without referring to the source video data.

2. Description of the Related Art

It is the ultimate goal of video experts to provide most perceptually appealing video images to viewers. One way to determine whether a resulting image quality is good or poor is to ask a panel of viewers to watch certain video sequences and to give their opinions. Another way to analyze video sequences is to provide an automated mechanism to evaluate the excellence or the degradation of the video quality. To this end, various metrics are used, i.e., sharpness, blocking, ringing, clipping, noise, contrast, and temporal impairments to evaluate the overall video-quality measure. Sharpness is related to the clarity of detail and edge definition of an image. The relative sharpness of an image can be measured, in the spatial domain, by the definition of edges in comparison to a reference image, for example. Perceived sharpness increases when objects are more clearly delineated from each other and from the background and have hard, sharply defined edges. However, in some cases increased edge contrast leads to reduction of fine details thus making sharpness and resolution opposite features.

Most of the work on sharpness in the last 20 years has been aimed at focus control for still-imaging modalities, such as photography, medical imaging, and Scanning Electron Microscopy (SEM). For example, a spatial domain approach, which is based on edge-profile acutance, uses a root mean-square gradient that is normal to the edges. In the frequency domain, Fast Fourier Transform (FFT) methods have been used based on the fact that a sharper or more focused image has more energy contained in the higher spatial frequencies. Although information about spatial coherency is not taken into account and that the measures of high frequencies are global rather than local, FFT-based methods have shown promising results. However, the main drawback of FFT-based methods has been that frequency contents are image-specific and thus they do not work in a no-reference mode, i.e., without subtracting the sharpness of the original image.

Accordingly, the present invention proposes an objective quality assessment using the video-sharpness metric based on higher order moments of the FFT spectrum to evaluate the objective quality of pictures without utilizing the source data.

SUMMARY OF THE INVENTION

The present invention is directed to an apparatus and method for evaluating the quality of video data without the use of a reference image.

According to an aspect of the invention, a method for estimating the sharpness quality of input-video data is provided. The method includes the steps of: converting the input-video data into corresponding digital-image data comprised of pixel values; generating Fast Fourier Transform (FFT) from at least some of the pixel values and computing an average FFT on the generated FFT; calculating a statistical reference using the average FFT; and, producing an image-quality metric from the calculated statistical reference. The FFT is generated on every predetermined horizontal line of image-pixel values. In the embodiment, the statistical-reference is obtained by calculating kurtosis or skewness using the average FFT. Then, the image-quality metric is produced by aligning either the kurtosis or skewness into a no-base line.

According to another aspect of the invention, a system for estimating the sharpness quality of input-video data is provided. The system includes a converter for converting the input-video data into corresponding digital-image data comprised of image-pixel values; an FFT generator, adapted to receive an output of the converter, for generating Fast Fourier Transform (FFT) from at least some of the image-pixel values and for computing an average FFT on the generated FFT; a statistical calculator for calculating a statistical reference based on the average FFT and for determining kurtosis and skewness of the generated FFT; and, an image-quality generator for producing an image-quality metric from the calculated statistical reference by aligning the kurtosis or skewness into a non-base line, wherein the FFT is generated on every predetermined horizontal line of the digital pixel values. The system further includes a memory coupled to the FFT generator for storing the generated FFT for a subsequent computation of the average FFT.

Still another aspect is that the present invention may be realized in a simple, reliable, and inexpensive implementation.

The foregoing and other features and advantages of the invention will be apparent from the following, more detailed description of preferred embodiments as illustrated in the accompanying drawings in which reference characters refer to the same parts throughout the various views. The drawings are not necessarily to scale; instead the emphasis is placed upon illustrating the principles of the invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Although a simple calculation of the energy contained in the high-frequency band may be an indicator of sharpness, it only works for certain types of content, under highly constrained conditions such as minimum noise, other artifacts, and high-quality image. As an alternative to a simple computation of the energy in the high-frequency band of the power spectrum, the present method focuses on statistical properties of the frequency distribution in the power spectrum. As a person of average skill in the art will appreciate, in general, a fundamental task in many statistical analyses is to characterize the location and variability of a data set. The characterization of the data can be represented with skewness and kurtosis. Skewness is a measure of symmetry, and a data set, or distribution, is considered symmetric if it looks the same to the left and right of the center point. Kurtosis is a measure of whether the data are peaked or flat relative to a normal distribution. Data sets with high kurtosis tend to have a distinct peak near the mean, then decline rapidly, and have heavy tails. Data sets with low kurtosis tend to have a flat top near the mean rather than a sharp peak.

Figure 1:
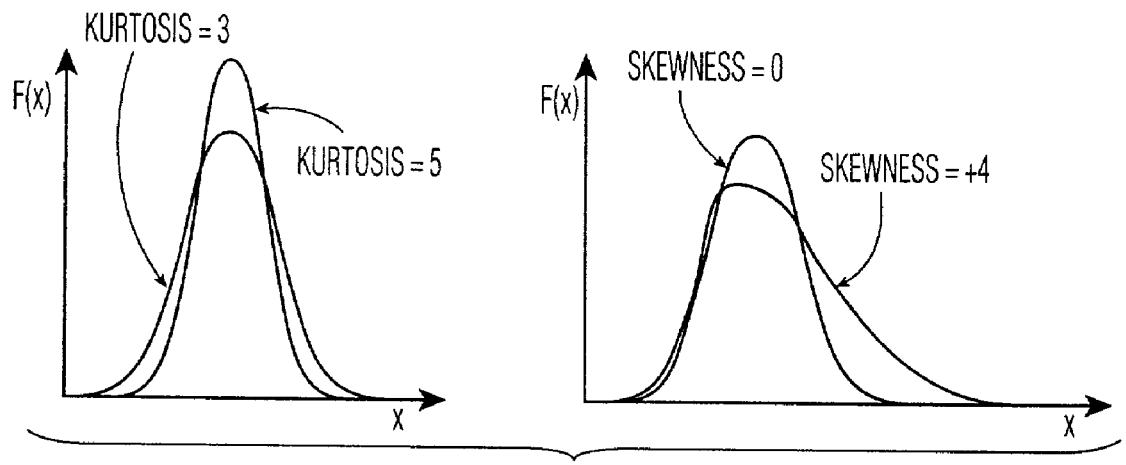
FIG. 1 is a graphical illustration of the statistical reference generated based on the Fast Fourier Transform.

FIG. 1 illustrates a graphical representation of the increase in the peak of probability density functions corresponding to an increase in Kurtosis (K) and Skewness (S). The characteristics of the kurtosis and skewness can be expressed mathematically as follows:

The n-th central moment of a probability distribution is defined as:

$$m_n = E[(X-\mu_x)^n]$$

where E denotes the probability expectation, $\mu_x = E[X]$, and $n \geq 0$. The second central moment is the variance. Based on the central moments, certain properties of distributions can be calculated, such as kurtosis and skewness.

Kurtosis is defined as the ratio of the moment of the $4^{th}$ order to the moment of the $2^{nd}$ order squared:

$$\text{Kurtosis} = \frac{m_4}{m_2^2}$$

Kurtosis is a dimension-less quantity, and when applied to a normal distribution it is a measure of flatness or peakness. Kurtosis for a standard normal distribution is three.

Skewness is defined as:

$$\text{Skewness} = \frac{m_3}{m_2^{3/2}}$$

Skewness, when applied to a normal distribution, is a measure of symmetry or the lack thereof (i.e., a distribution skewed to the left has negative skewness, while positive skewness indicates that the distribution is skewed to the right).

If the Fast Fourier Transform (FFT) is used as a probability distribution, skewness is expressed as:

$$\text{Skewness} = \frac{\sum_{i=1}^{N}(Y_i - \overline{Y})^3}{(N-1)s^3}, \quad (1)$$

and kurtosis is expressed as:

$$\text{Kurtosis} = \frac{\sum_{i=1}^{N}(Y_i - \overline{Y})^4}{(N-1)s^4}, \text{ where} \quad (2)$$

$$s^2 = \frac{\sum_{i=1}^{N}(Y_i - \overline{Y})^2}{(N-1)},$$

wherein $\overline{Y}$ represents the average FFT and $s^2$ represents variance, $Y_i$ represents the individual values of the FFT coefficients, and N is the size of the FFT (N pixels in the spatial domain are used to compute an N-sized FFT).

The FFT is a fast computation of the Discrete Fourier Transform (DFT), defined as:

$$F(k) = \frac{1}{\sqrt{N}} \sum_{n=0}^{N-1} f(n) e^{-j2\pi kn/N},$$

and its inverse:

$$f(n) = \frac{1}{\sqrt{N}} \sum_{k=0}^{N-1} F(k) e^{+j2\pi nk/N},$$

where f(n) is the spatial-domain signal, and F(k) is the frequency or transformed domain signal. The spatial-domain signal values represent luminance or chrominance values of the image. The present invention incorporates the above-mentioned statistical properties of FFT in evaluating the video quality of pictures without the need for gaining access to the source picture.

Figure 2:
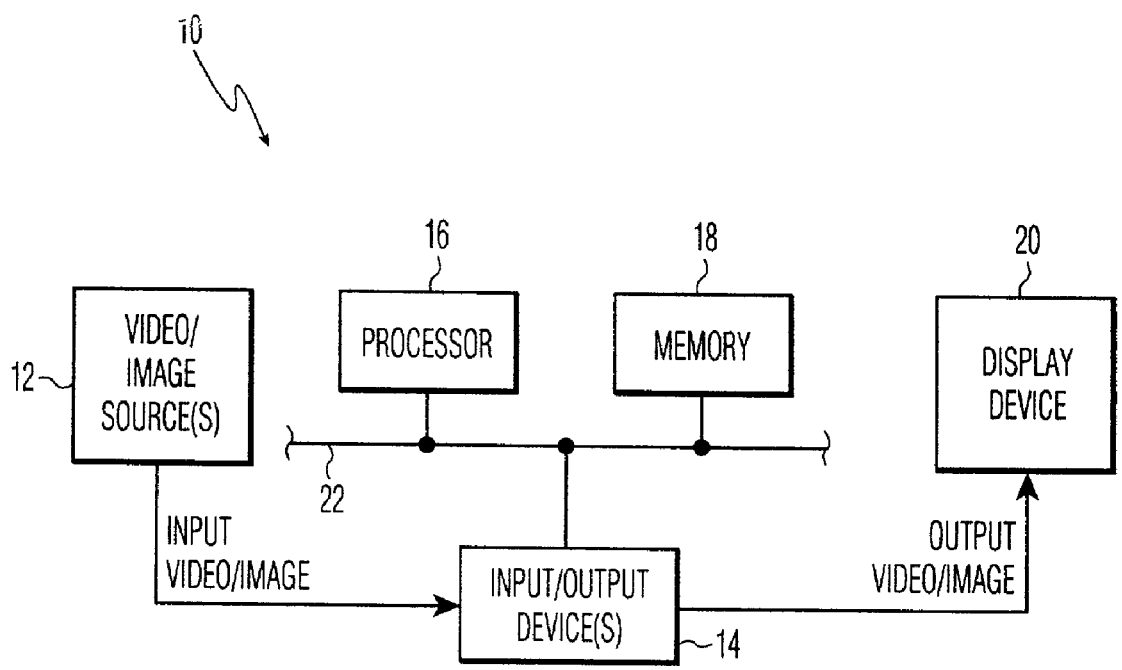
FIG. 2 is a simplified block diagram whereto the embodiment of the present invention is applicable.

FIG. 2 illustrates a sharpness-processing system 10 according to an embodiment of the present invention. By way of example, the system 10 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. As shown in FIG. 2, the system 10 includes one or more video/image sources 12, one or more input/output devices 14, a processor 16, a memory 18, and a display device 20. The input/output devices 14, processor 16, and memory 18 may communicate over a communication medium 22, which may represent, i.e., a bus, a communication network, one or more internal connections of a circuit, circuit card or other device, as well as portions and combinations of these and other communication media. The memory 18 may represent, i.e., disk-based optical or magnetic storage units, electronic memories, as well as portions or combinations of these and other memory devices. Note that various functional operations associated with the sharpness system 10 may be implemented in whole or in part in one or more software programs/signal processing routines stored in the memory 18 and executed by the processor 16. In other embodiments, however, hardware circuitry, such as an application-specific integrated circuit (ASIC), may be used in place of, or in combination with, software instructions to implement the invention.

Figure 3:
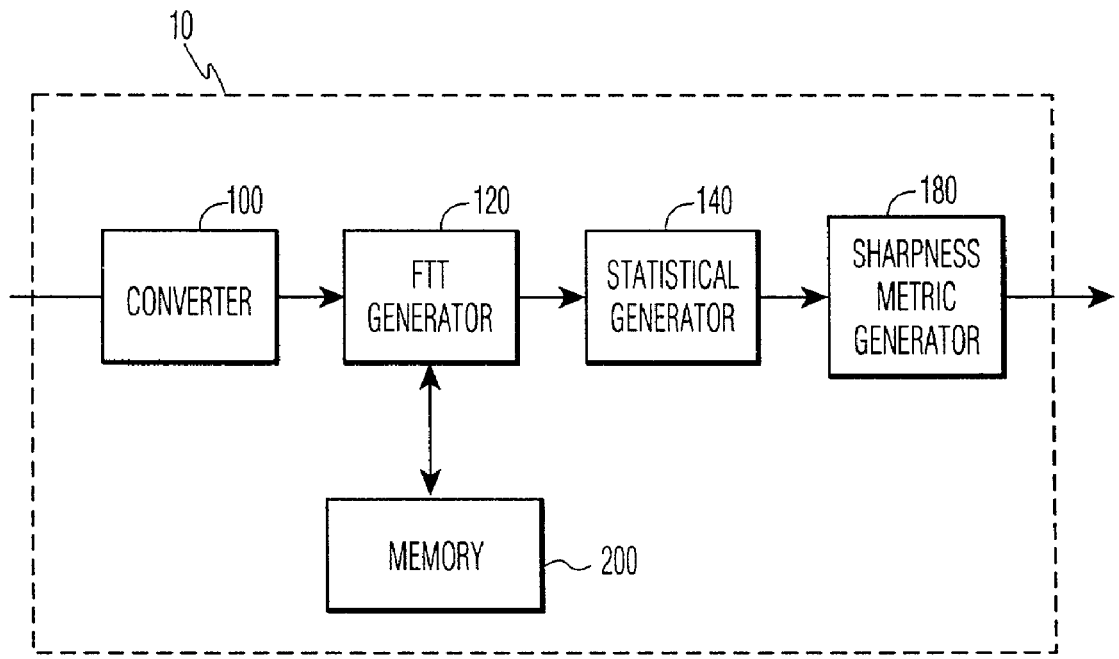
FIG. 3 is a detailed functional block diagram of the sharpness-processing system in accordance with the present invention.

FIG. 3 depicts a functional block diagram of the sharpness processing system 10. The sharpness system 10 comprises a converter 100, a FFT circuit 120, a statistical (K&S) generator 140, a sharpness metric generator 180, and a memory 200. Each component of the sharpness system 10 is discussed in detail below.

In operation, the converter 100 converts the input-video data into corresponding digital image data comprised of pixel values, then the FFT generator 120 performs FFT in the horizontal and vertical directions for every predetermined line (i.e., every 10 line) using line sizes that are smaller than the width and height of the image. The lines must not sub-sample the image, but the lines chosen are not contiguous, i.e., every $10^{th}$ line, so as to exploit spatial redundancy (similarity) among neighboring lines. As the FFT is performed for every predetermined line, the processed FFT is stored briefly in the memory 200 until the FTT for all lines are performed. Then, an average FFT value is calculated and forwarded to the K&S generator 140. In a minimal implementation, only the FFT of horizontal lines is used, leading to a calculation of vertical sharpness. The sharpness of vertical objects is perceptually the most important, and in many cases it is sufficient to estimate image sharpness. Using the average FFT for all calculated lines, the kurtosis and skewness are computed using equations (1) and (2). The transformer 180 computes an image-quality metric without the use of a source-video sequence based on the kurtosis and skewness references.

Now, a detailed description of the embodiment illustrating the video-quality estimation process is explained hereinafter with reference to FIGS. 4–7.

Figure 4:
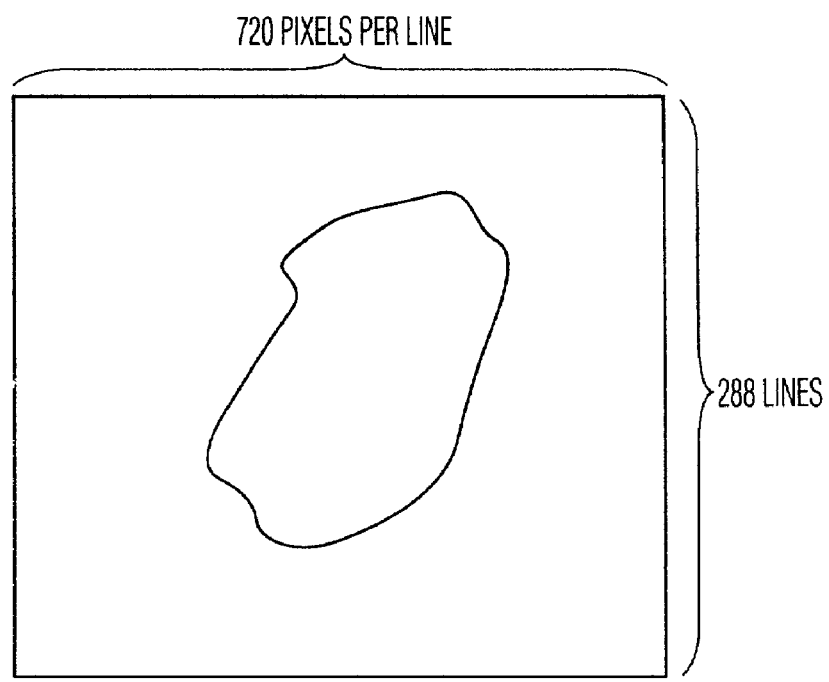
FIG. 4 is a diagram illustrating a part of the operation steps of evaluating the image sharpness in accordance with the present invention.

Referring to FIG. 4, an input-video image is converted to 8×8 pixel blocks of digital values of luminance and color difference. To this end, video input is typically sampled, for example, at 4:2:2, where a red-color difference signal (Cr) and a blue-color difference signal (Cb) are sub-sampled 2-to-1 with respect to a luminance (Y) signal. The MPEG standard provides that the luminance component Y of a video signal may be sampled with respect to the color difference signals Cr, Cb by a ratio of 4-to-1. Note that the present invention allows the use of other sampling ratios that are typically formatted to contain all the picture content. Sampling video-input images into a predetermined format is well known in the art and can be performed in a variety of ways that are readily recognized by those skilled in this art. After an input-video image is sampled and formatted, each frame includes a plurality of horizontal scan lines for display, as shown in FIG. 4.

Figure 5:
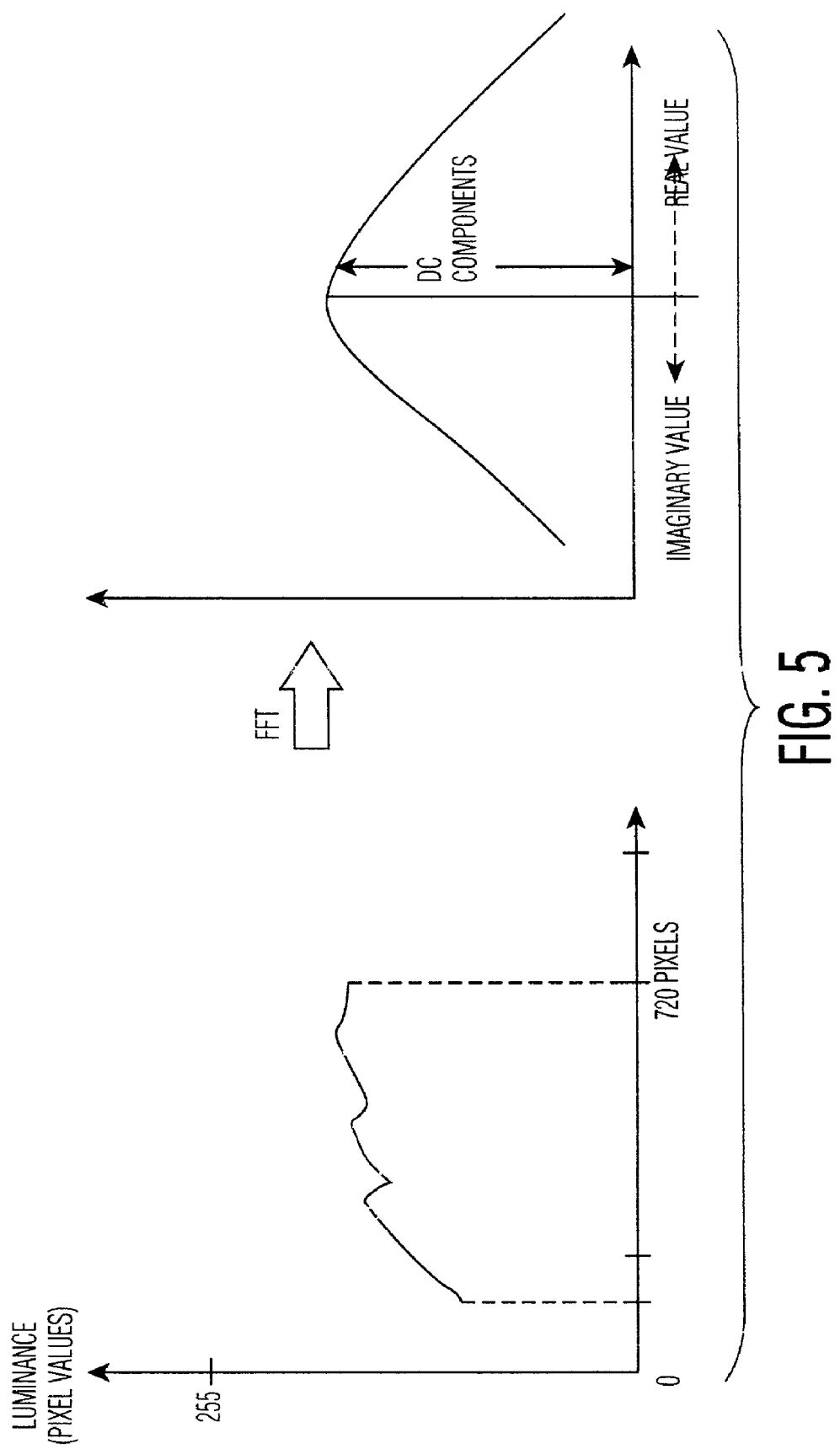
FIG. 5 is a graphical illustration of a portion of the operation steps of evaluating the image sharpness in accordance with the present invention.

Referring to FIG. 5, the image centered on the 720-pixel wide and 512 horizontal lines, as shown in FIG. 4, is subject to the FFT computation, in which every 10 lines are subject to the FFT operation on each field (288 lines) for a total of 28 FFTs per field. In this example, the FFT window size is 512×288/10, or 512×28 because line sizes that are smaller than the width and height of the image are used according to the embodiment of the present invention. The horizontal FFTs for all lines calculated thereon are averaged to obtain an average FFT value. Using the average FFT value, kurtosis and skewness are calculated according to equations (1) and (2) for the top half of the spectrum, excluding the DC component. Note that in an alternate embodiment, the FFT may be calculated over the entire image or over a region of the image. Thereafter, an image-quality metric capable of assessing the video quality without the use of a source-video sequence is obtained, as discussed below with reference to FIG. 6.

Figure 6:
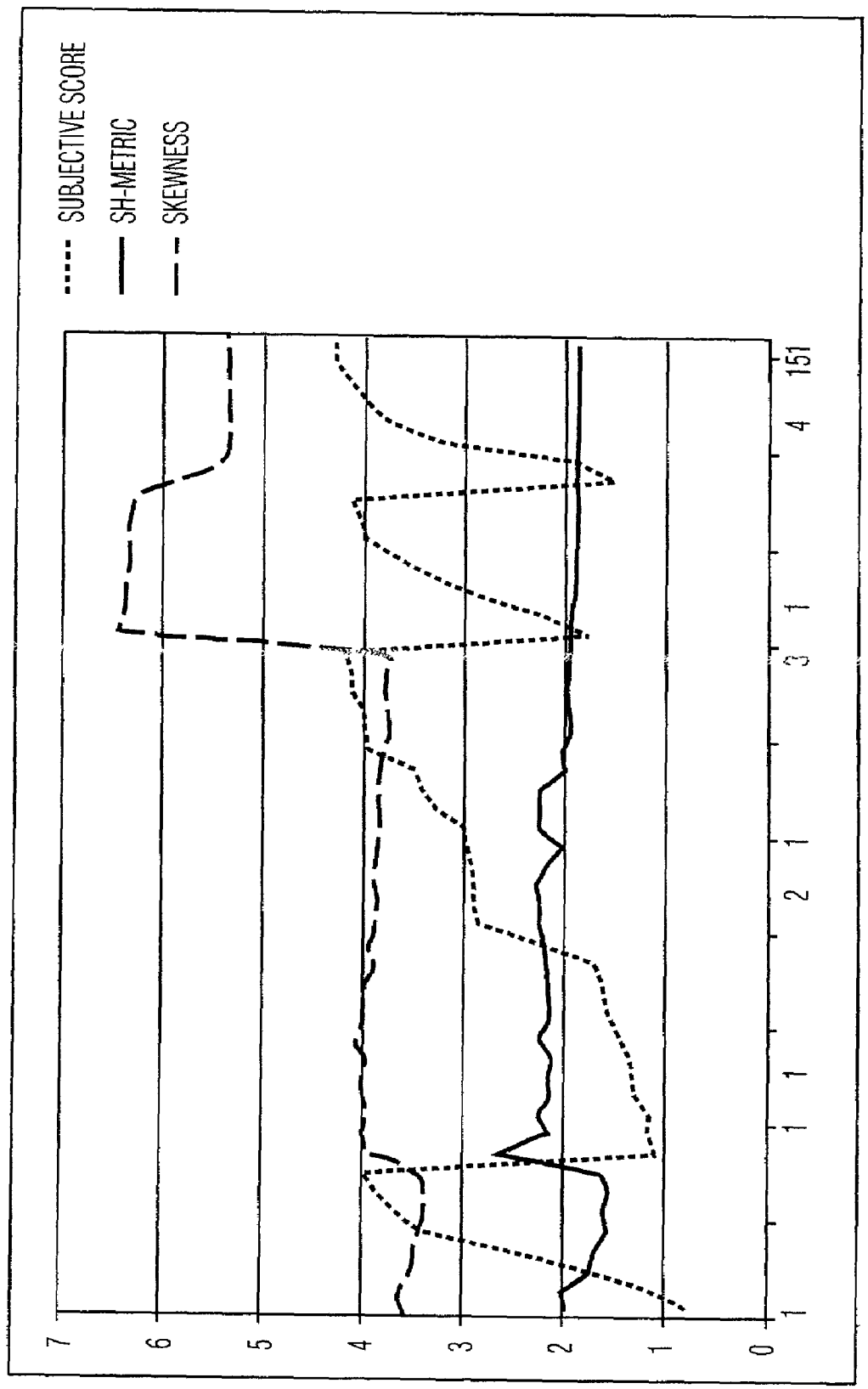
FIG. 6 is a graphical illustration of a portion of the operation steps according to an exemplary embodiment of the present invention; and, FIG. 7 is a flow chart illustrating the operation steps of evaluating the video quality in accordance with the present invention.

FIG. 6 shows a graphical diagram illustrating the video-estimation process to obtain an image-quality metric according to the embodiment of the present invention. An estimate of the sharpness metric can be derived based on the scatter plot representative of the kurtosis and skewness computed by the K&S generator 140 using equations (1) and (2), by offsetting the respective plots to a non-base line. If the kurtosis or skewness line can be offset, such that the respective lines can exhibit the characteristics of a substantially flat line (or a non-base line) as shown in FIG. 6, it would turn the kurtosis or skewness into a no-reference sharpness metric. Thus, the objective is to remove the large variability of the kurtosis and skewness lines while preserving the fine variability related to the picture sharpness. The offset to the non-base line is calculated according to the following equation:

The sharpness metric can be represented as a function of skewness and variance of the FFT distributions as follows:

$$SH = \frac{\text{Tan}\left(C_1 \frac{Sk}{\text{var}}\right) + C_2 Sk}{2}, \text{ and}$$

$$\text{var} = \sqrt{\frac{\sum_{i=1}^{N}(Y_i - \overline{Y})^2}{(N-1)}},$$

where $C_1=5E4$, $C_{2=0.5}$, If SH>6.5=>SH=0.25SH, and SK is represented by equation (1). These equations represent the general form of logistic or polynomial functions of kurtosis or skewness. The values of the coefficients depend on the sequences used to test the sequences, the larger the set the higher the precision of the metric.

Alternatively, the sharpness metric can be represented as a function of kurtosis and variance of the FFT distributions in two ways as follows:

$$SH=2.5546\ Ln(\text{kurtosis})-3.8496,$$

$$SH=(var)^{0.485}/100$$

Figure 7:
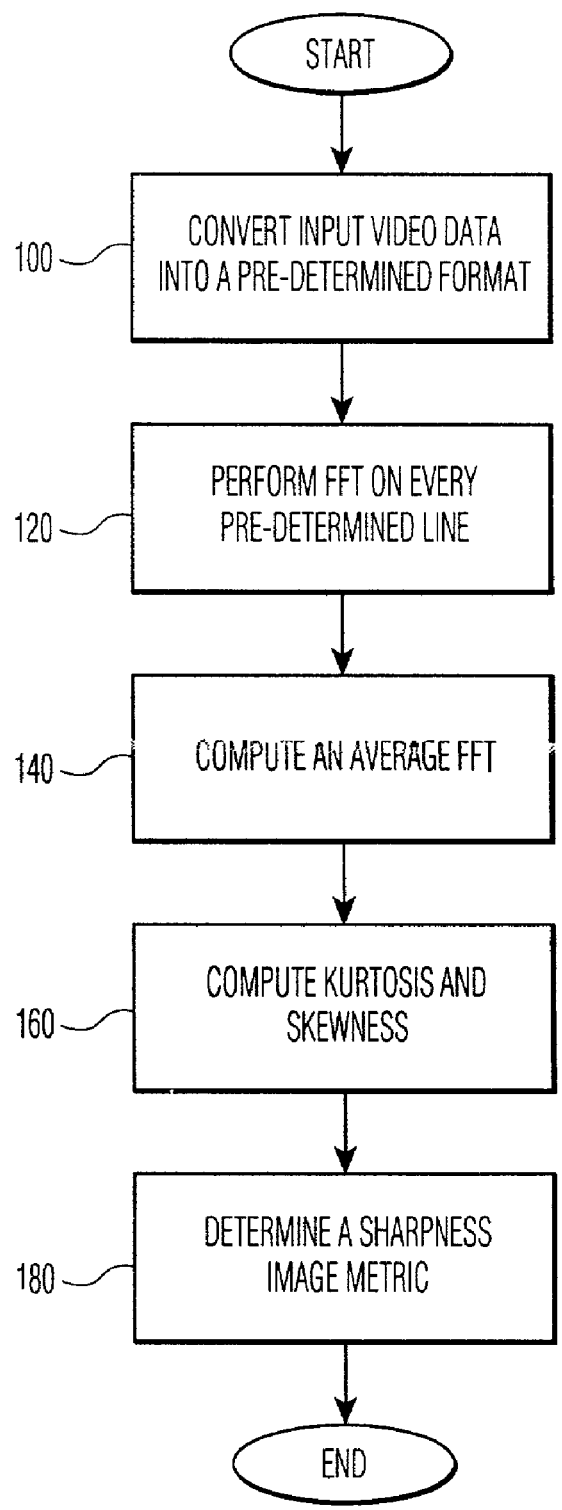

FIG. 7 is a flow diagram depicting the operation steps of evaluating the video quality without the availability of a reference-source video signal in accordance with the embodiment of the present invention.

At step 120, the FFT in the horizontal and vertical directions are performed for every predetermined line (i.e., every 10 line) using line sizes that are smaller than the width and height of the image. Then, an average FFT is determined in step 140 for the image, and using the average FFT, the kurtosis and skewness are calculated for every predetermined line according to equations (1) and (2) in step 160. Finally, in step 180, the sharpness metric is obtained by aligning the kurtosis and skewness calculated in step 160 into a no-base line.

As is apparent from the foregoing, the present invention has an advantage in that the sharpness metric system 10 uses the statistical properties of the FFT to obtain a sharpness metric without use of the source reference data. In the prior art, utilizing the original video as a reference was not applicable to in-service quality monitoring and the development of a continuous quality-control system. Thus, the teaching of the present invention can benefit many video applications, such as the focus control of the video imager, video-processing algorithm development, real-time video quality monitoring/control, and real-time quality control of the networked video.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for estimating the sharpness quality of input-video data, the method comprising the steps of:
    converting said input-video data into corresponding digital-image data comprised of pixel values;
    generating Fast Fourier Transform (FFT) from at least some of said pixel values and computing an average FFT on said generated FFT;
    calculating a statistical reference using said average FFT; and,
    producing an image-quality metric from said calculated statistical reference,
wherein the statistical-reference calculating step comprises the step of calculating kurtosis using said average FFT, and wherein said image-quality metric (SH) is produced by calculating an offset of said kurtosis according to one of the following equations:

$$SH = 2.5546\, Ln(\text{kurtosis}) - 3.8496, \text{ and}$$

$$SH(var)^{0.485}/100,$$

where SH represents said image-quality metric and var represents the variance as follows:

$$\text{var} = \sqrt{\frac{\sum_{i=1}^{N}(Y_i - \overline{Y})^2}{(N-1)}}.$$

wherein $\overline{Y}$ represents an average FFT, $Y_i$ represents an individual value of said generated FFT, and N represents the size of said generated FFT.

2. The method of claim 1, wherein said kurtosis is calculated according to the following equation:

$$\text{Kurtosis} = \frac{\sum_{i=1}^{N}(Y_i - \overline{Y})^4}{(N-1)s^4}, \text{ and}$$

$$s^2 = \frac{\sum_{i=1}^{N}(Y_i - \overline{Y})^2}{(N-1)},$$

wherein $\overline{Y}$ represents an average FFT, s represents variance, $Y_i$ represents an individual value of said generated FFT, and N represents the size of said generated FFT.

3. The method of claim 1, wherein said FFT is generated on every predetermined horizontal line of said pixel values.

4. A method for estimating the sharpness quality of input-video data, the method comprising the steps of:
    converting said input-video data into corresponding digital-image data comprised of pixel values;
    generating Fast Fourier Transform (FFT) from at least some of said pixel values and computing an average FFT on said generated FFT;
    calculating a statistical reference using said average FFT; and,
    producing an image-quality metric from said calculated statistical reference,
wherein the statistical reference calculating step comprises the step of calculating kurtosis using said average FFT, and wherein said image-quality metric (SH) is produced by calculating an offset of said kurtosis according to the following equation:

$$SH = (\text{var})^{0.485}/100, \text{ and}$$

$$\text{var} = \sqrt{\frac{\sum_{i=1}^{N}(Y_i - \overline{Y})^2}{(N-1)}}.$$

wherein $\overline{Y}$ represents an average FFT, $Y_i$ represents an individual value of said generated FFT, and N represents the size of said generated FFT.

5. The method of claim 4, wherein said FFT is generated on every predetermined horizontal line of said pixel values.

6. A method for estimating the sharpness quality of input-video data, the method comprising the steps of:
    converting said input-video data into corresponding digital-image data comprised of pixel values;
    generating Fast Fourier Transform (FFT) from at least some of said pixel values and computing an average FFT on said generated FFT;
    calculating a statistical reference using said average FFT; and,
    producing an image-quality metric from said calculated statistical reference,
wherein the statistical-reference calculating step comprises the step of calculating skewness using said average FFT, and wherein said image-quality metric (SH) is produced by calculating an offset of said skewness according to the following equations:

$$SH = \frac{\text{Tan}\left(C_1 \frac{Sk}{\text{var}}\right) + C_2 Sk}{2}, \text{ and}$$

$$\text{var} = \sqrt{\frac{\sum_{i=1}^{N}(Y_i - \overline{Y})^2}{(N-1)}},$$

wherein $\overline{Y}$ represents an average FFT, $C_1$=5E4, $C_2$=0.5, Sk represents said skewness, $Y_i$ represents an individual value of said generated FFT, and N represents the size of said generated FFT.

7. The method of claim 6, wherein said skewness is calculated according to the following equation:

$$\text{Skewness} = \frac{\sum_{i=1}^{N}(Y_i - \overline{Y})^3}{(N-1)s^3}.$$

wherein $\overline{Y}$ represents an average FFT, s represents variance, $Y_i$ represents an individual value of said generated FFT, and N represents the size of said generated FFT.

8. The method of claim 6, wherein said FFT is generated on every predetermined horizontal line of said pixel values.

9. A system for estimating the sharpness quality of input-video data, comprising:
   a converter for converting said input-video data into corresponding digital-image data comprised of image pixel values;
   an FFT generator, adapted to receive an output of said converter, for generating Fast Fourier Transform (FFT) from at least some of said image-pixel values and for computing an average FFT on said generated FFT;
   a statistical calculator for calculating a statistical reference based on said average FFT; and,
   an image-quality generator for producing an image-quality metric from said calculated statistical reference,
wherein said statistical calculator is further configured to determine a kurtosis of said generated FFT, and wherein said image-quality generator determines said image-quality metric (SH) based on said determined kurtosis using one of the following equations:

$SH = 2.5546 \, Ln(\text{kurtosis}) - 3.8496$, and $SH = (var)^{0.485}/100$, where SH represents said image-quality metric and var represents the variance as follows:

$$\text{var} = \sqrt{\frac{\sum_{i=1}^{N}(Y_i - \overline{Y})^2}{(N-1)}}.$$

wherein $\overline{Y}$ represents an average FFT, k represents said skewness, $Y_i$ represents an individual value of said generated FFT, and N represents the size of said generated FFT.

10. The system of claim 9, wherein said FFT is generated on every predetermined horizontal line of said digital-pixel values.

11. A system for estimating the sharpness quality of input-video data, comprising:
   a converter for converting said input-video data into corresponding digital-image data comprised of image pixel values;
   an FFT generator, adapted to receive an output of said converter, for generating Fast Fourier Transform (FFT) from at least some of said image-pixel values and for computing an average FFT on said generated FFT;
   a statistical calculator for calculating a statistical reference based on said average FFT; and,
   an image-quality generator for producing an image-quality metric from said calculated statistical reference,
wherein said statistical calculator is further configured to determine a kurtosis of said generated FFT, and wherein said kurtosis is calculated according to the following equation:

$$\text{Kurtosis} = \frac{\sum_{i=1}^{N}(Y_i - \overline{Y})^4}{(N-1)s^4}, \text{ and}$$

$$s^2 = \frac{\sum_{i=1}^{N}(Y_i - \overline{Y})^2}{(N-1)},$$

wherein $\overline{Y}$ represents an average FFT, $Y_i$ represents an individual value of said generated FFT, N represents the size of said generated FFT, and s represents variance.

12. The system of claim 11, wherein said FFT is generated on every predetermined horizontal line of said digital-pixel values.

13. A system for estimating the sharpness quality of input-video data, comprising:
   a converter for converting said input-video data into corresponding digital-image data comprised of image pixel values;
   an FFT generator, adapted to receive an output of said converter, for generating Fast Fourier Transform (FFT) from at least some of said image-pixel values and for computing an average FFT on said generated FFT;
   a statistical calculator for calculating a statistical reference based on said average FFT; and,
   an image-quality generator for producing an image-quality metric from said calculated statistical reference,
wherein said statistical calculator is further configured to determine a skewness of said generated FFT, and wherein said image-quality generator determines said image-quality metric (SH) based on said skewness using one of the following equations:

$$SH = \frac{\text{Tan}\left(C_1 \frac{Sk}{\text{var}}\right) + C_2 Sk}{2}, \text{ and}$$

$$\text{var} = \sqrt{\frac{\sum_{i=1}^{N}(Y_i - \overline{Y})^2}{(N-1)}},$$

wherein $\overline{Y}$ represents an average FFT, $C_1 = 5E4$, $C2 = 0.5$, Sk represents said skewness, $Y_i$ represents an individual value of said generated FFT, and N represents the size of said generated FFT.

14. The system of claim 13, wherein said FFT is generated on every predetermined horizontal line of said digital-pixel values.

15. A system for estimating the sharpness quality of input-video data, comprising:
   a converter for converting said input-video data into corresponding digital-image data comprised of image pixel values;
   an FFT generator, adapted to receive an output of said converter, for generating Fast Fourier Transform (FFT) from at least some of said image-pixel values and for computing an average FFT on said generated FFT;
   a statistical calculator for calculating a statistical reference based on said average FFT; and,
   an image-quality generator for producing an image-quality metric from said calculated statistical reference, wherein said statistical calculator is further configured to determine a skewness of said generated FFT and wherein said skewness is calculated according to the following equation:

$$\text{Skewness} = \frac{\sum_{i=1}^{N}(Y_i - \overline{Y})^3}{(N-1)s^3}.$$

wherein $\overline{Y}$ represents an average FFT, s represents variance, $Y_i$ represents an individual value of said generated FFT, and N represents the size of said generated FFT.

16. The system of claim 15, wherein said FFT is generated on every predetermined horizontal line of said digital-pixel values.

17. A machine-readable medium having stored thereon data representing sequences of instructions, and the sequences of instructions which, when executed by a processor, cause the processor to:

convert an input-video data into corresponding digital-image data comprised of pixel values;

generate Fast Fourier Transform (FFT) from at least some of said image pixel values and compute an average FFT on said generated FFT;

calculate a statistical reference using said average FFT; and, produce an image-quality metric from said calculated statistical reference, wherein the statistical-reference calculating step comprises the step of calculating kurtosis using said average FFT, and wherein said image-quality metric (SH) is produced by calculating an offset of said kurtosis according to one of the following equations:

$SH=2.5546\ Ln(\text{kurtosis})-3.8496$, and $SH=(var)^{0.485}/100$, where SH represents said image-quality metric and var represents the valiance as follows:

$$\text{var} = \sqrt{\frac{\sum_{i=1}^{N}(Y_i - \overline{Y})^2}{(N-1)}},$$

wherein $\overline{Y}$ represents an average FFT, $Y_i$ represents an individual value of said generated FFT, and N represents the size of said generated FFT.

* * * * *